(12) United States Patent
Bengtsson et al.

(10) Patent No.: US 11,665,669 B2
(45) Date of Patent: May 30, 2023

(54) CONDITIONAL RESOURCE UTILIZATION FOR DEVICE-TO-DEVICE COMMUNICATION

(71) Applicant: Sony Group Corporation, Tokyo (JP)

(72) Inventors: Erik Bengtsson, Eslöv (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/349,898

(22) PCT Filed: Nov. 16, 2016

(86) PCT No.: PCT/EP2016/077854
§ 371 (c)(1),
(2) Date: May 14, 2019

(87) PCT Pub. No.: WO2018/091080
PCT Pub. Date: May 24, 2018

(65) Prior Publication Data
US 2020/0068532 A1      Feb. 27, 2020

(51) Int. Cl.
*H04W 72/02*     (2009.01)
*H04W 76/14*     (2018.01)
(Continued)

(52) U.S. Cl.
CPC .......... *H04W 72/02* (2013.01); *H04W 8/005* (2013.01); *H04W 72/042* (2013.01); *H04W 76/14* (2018.02)

(58) Field of Classification Search
CPC ... H04W 72/02; H04W 72/042; H04W 76/14; H04W 8/005
(Continued)

(56) References Cited

U.S. PATENT DOCUMENTS

2014/0094183 A1*  4/2014  Gao .................. H04W 72/04
                                                        455/450
2015/0215903 A1    7/2015  Zhao
(Continued)

FOREIGN PATENT DOCUMENTS

WO         2014022776 A1     2/2014
WO   WO-2014022776 A1 *      2/2014  ......... H04L 41/0836
(Continued)

OTHER PUBLICATIONS

International Search Report and Written Opinion from counterpart International Patent Application No. PCT/EP2016/077854 dated Aug. 14, 2017; 14 pages.
(Continued)

*Primary Examiner* — Christopher M Crutchfield
*Assistant Examiner* — Jean F Voltaire
(74) *Attorney, Agent, or Firm* — Tucker Ellis LLP (57) ABSTRACT

A wireless communication device (100, 100') receives resource allocation information from a wireless communication network. The resource allocation information indicates at least one condition for utilization of a set of resources allocated to device-to-device communication. Depending on the at least one condition, the wireless communication device (100, 100') controls utilization of the set of resources for device-to-device communication between the wireless communication device (100, 100') and a further wireless communication device (100, 100').

19 Claims, 4 Drawing Sheets

(51) Int. Cl.
*H04W 8/00* (2009.01)
*H04W 72/04* (2023.01)

(58) Field of Classification Search
USPC .......................................................... 370/329
See application file for complete search history.

(56) References Cited

U.S. PATENT DOCUMENTS

| | | | |
|---|---|---|---|
| 2015/0215981 A1* | 7/2015 | Patil | H04W 72/02 |
| | | | 370/329 |
| 2017/0019822 A1* | 1/2017 | Zhao | H04W 8/005 |
| 2017/0034834 A1* | 2/2017 | Folke | H04W 76/14 |
| 2017/0118741 A1* | 4/2017 | Jung | H04W 8/005 |
| 2017/0142741 A1* | 5/2017 | Kaur | H04W 72/121 |

FOREIGN PATENT DOCUMENTS

| | | |
|---|---|---|
| WO | 2015143170 A1 | 9/2015 |
| WO | 2015167304 A1 | 11/2015 |

OTHER PUBLICATIONS

Huawei et al., "Conditions to Exit Mode 2 for D2D Communication" 3rd Generation Partnership Project (3GPP), R2-143457, vol. RAN WG2, Aug. 14, 2014; 4 pages.

3rd Generation Partnership Project Technical Specification Group Radio Access Network; Evolved Universal Terrestrial Radio Access (E-UTRA) and Evolved Universal Terrestrial Radio Access Network (E_UTRAN); Stage 2, 3GPP TS 36.300 V14.0.0 (Sep. 2016); 313 pages.

* cited by examiner

CONDITIONAL RESOURCE UTILIZATION FOR DEVICE-TO-DEVICE COMMUNICATION

FIELD OF THE INVENTION

The present invention relates to methods for controlling communication in a wireless communication network and to corresponding devices and systems.

BACKGROUND OF THE INVENTION

In wireless communication networks, communication is typically based on downlink (DL) transmissions from a base station to a UE (user equipment) and on uplink (UL) transmissions from the UE to the base station. Further, it is known to use direct device-to-device (D2D) communication, also referred to as sidelink (SL) communication, between two UEs. In the case of D2D communication, the data is transmitted directly between the two UEs, without passing through a base station.

In the case of the LTE technology specified by 3GPP ($3^{rd}$ Generation Partnership Project), is for example specified in 3GPP TS 36.300 V14.0.0 (2016-09). In this case, the SL communication by a given UE may be controlled by a base station, in the LTE technology referred to as eNB. For example, the eNB may control the SL communication with respect to allocation of resources to be used for the SL communication. For example, the eNB may allocate resources by scheduling individual SL transmissions, or the eNB may configure a resource pool from which the UE may autonomously select the resources it uses for a SL transmission. The latter option may allow for achieving lower signalling overhead, in particular in scenarios where the eNB needs to control SL communication of multiple UEs.

However, with increasing amount SL communication, it becomes increasingly difficult to provide sufficient resources for SL communication, specifically when considering that resources are also needed for DL transmissions and UL transmissions.

Accordingly, there is a need for techniques that allow for efficiently controlling device-to-device communication in a wireless communication network.

SUMMARY OF THE INVENTION

According to an embodiment, a method of controlling communication in a wireless communication network is provided. According to the method, a wireless communication device receives resource allocation information from the wireless communication network. The resource allocation information indicates at least one condition for utilization of a set of resources allocated to D2D communication. Depending on the at least one condition, the wireless communication device controls utilization of the set of resources for D2D communication between the wireless communication device and a further wireless communication device. By indicating the at least one condition to the wireless communication device, the wireless communication network can efficiently control the utilization of the set of resources by the wireless communication device. Specifically, decisions on whether or how to utilize the set of resources may be performed at the wireless communication device, thereby reducing the load on base stations or other nodes of the wireless communication network.

According to an embodiment, the set of resources is further allocated to communication with a base station of the wireless communication network. Accordingly, the set of resources may be efficiently used by sharing them both for the D2D communication and for DL and/or UL communication with the base station. Since the distances over which the D2D communication occurs can be much shorter than the distances over which the DL and/or UL communication with the base station occurs, the resulting levels of interference may be tolerable.

According to an embodiment, the at least one condition is based on a characteristic of a radio channel between the wireless communication device and the base station, e.g., on a radio channel quality, a received signal strength, and/or a signal-to-noise ratio (SNR). Further, the characteristic of the radio channel could be based on a ratio of a received signal strength to a transmit power for UL communication from the wireless communication device. By considering the characteristic of the radio channel, a risk and/or level of interference of transmissions of the D2D communication with transmissions to or from the base station can be efficiently taken into account when controlling the D2D communication.

The at least one condition may be based on a comparison of the characteristic of the radio channel to a threshold. For example, if the radio channel quality, received signal strength, SNR, or ratio of received signal strength to UL transmit power is above a threshold, the wireless communication device is typically close to the base station and the risk and/or level of interference on the set of radio resources is high. The condition may then define that the wireless communication device is not allowed to use the set of resources for D2D communication. On the other hand, if the radio channel quality, received signal strength, SNR, or ratio of received signal strength to UL transmit power is below a threshold, the wireless communication device is typically rather far from the base station and the risk and/or level of interference on the set of radio resources is low. The condition may then define that the wireless communication device is allowed to use the set of resources for D2D communication. The threshold may be indicated in the resource allocation information.

According to an embodiment, the wireless communication device controls the utilization of the set of resources by deciding whether to utilize the set of resources for the D2D communication between the wireless communication device and the further wireless communication device. In this way, interference with other transmissions on the set of radio resources can be efficiently avoided by utilizing the set of radio resources only under conditions when the risk or level of interference is low.

According to an embodiment, the wireless communication device controls the utilization of the set of resources by deciding which part of the set of resources is to be utilized for the D2D communication between the wireless communication device and the further wireless communication device. In this way, it can be taken into account that the risk or level of interference may vary between different parts of the set of resources.

According to an embodiment, the set of resources comprises a first subset of resources allocated to DL transmissions from the base station and a second subset of resources allocated for UL transmissions to the base station. The wireless communication device may then control the utilization of the set of resources by deciding whether to utilize at least one of the first subset of resources and the second subset of resources for the D2D communication between the wireless communication device and the further wireless communication device. For example, under conditions where the wireless communication device is far away from the base station, there is a risk that utilization of the first subset of resources by the wireless communication device causes excessive interference for DL transmissions to another nearby wireless communication device, and the wireless communication device may thus decide to utilize only the second subset of resources.

According to an embodiment, the wireless communication device controls the utilization of the set of resources by setting one or more transmission parameters for the D2D communication. For example, this may involve setting a transmit power, a modulation scheme, and/or a coding scheme. In this way, the wireless communication device may adapt its D2D communication in such a way that the interference remains on a tolerable level.

According to an embodiment, the at least one condition is based on strength of a signal as received by the wireless communication device from one or more base stations of the wireless communication network and/or on strength of a signal as received by the wireless communication device from one or more other wireless communication devices. These signals may allow for assessing the expected interference situation when utilizing the set of resources for D2D communication. For example, the signals may allow for assessing the risk and/or level of interference with transmissions to or from a base station the wireless communication device is connected to and/or the risk/and or level of interference with transmissions to or from one or more other base stations.

According to a further embodiment, a method of controlling communication in a wireless communication network is provided. According to the method a base station of the wireless communication network determines a set of resources allocated to D2D communication. Further, the base station determines at least one condition for controlling utilization of the set of resources for D2D communication between a wireless communication device and a further wireless communication device. Further, the base station sends resource allocation information indicating the at least one condition to the wireless communication device.

According to an embodiment, the base station determines the at least one condition depending on availability of resources for D2D communication. In this way, the base station can adapt the actual utilization of the set of resources by the wireless communication device to different loads of the wireless communication network. For example, in situations when the load is high and only few resources are available for D2D communication, the base station may choose another condition than in situations when the load is low and more resources are available for D2D communication.

According to an embodiment, the base station determines the at least one condition based on strengths of one or more signals as received by the base station. In this way, the base station can adapt the actual utilization of the set of resources by the wireless communication device to different interference situations. For example, in situations when high interference is expected, the base station may choose another condition than in situations when the lower interference is expected.

According to an embodiment, the base station determines the condition based on information received from one or more other base stations of the communication network. In this way, the base station can coordinate the condition with the other base stations. This may allow for reducing the risk and/or level of interference of communication controlled by the other base stations on the D2D communication of the wireless communication device. Further, this may allow for reducing the risk and/or level of interference caused by the D2D communication of the wireless communication device with respect to communication controlled by the other base stations.

According to an embodiment, the set of resources is further allocated to communication with the base station. Accordingly, the set of resources may be efficiently used by sharing them both for the D2D communication and for DL and/or UL communication with the base station. Since the distances over which the D2D communication occurs can be much shorter than the distances over which the DL and/or UL communication with the base station occurs, the resulting levels of interference may be tolerable.

According to an embodiment, the at least one condition is based on a characteristic of a radio channel between the wireless communication device and the base station, e.g., on a radio channel quality, a received signal strength, and/or an SNR. Further, the characteristic of the radio channel could be based on a ratio of a received signal strength to a transmit power for UL communication from the wireless communication device. By considering the characteristic of the radio channel, a risk and/or level of interference of transmissions of the D2D communication with transmissions to or from the base station can be efficiently taken into account when controlling the D2D communication. As mentioned above, the at least one condition may be based on a comparison of the characteristic of the radio channel to a threshold, and the threshold may be indicated by the resource allocation information.

According to an embodiment, the at least one condition applies for controlling the utilization of the set of resources by deciding whether to utilize the set of resources for the D2D communication between the wireless communication device and the further wireless communication device. In this way, interference with other transmissions on the set of radio resources can be efficiently avoided by allowing utilization of the set of radio resources only under conditions when the risk or level of interference is low.

According to an embodiment, the at least one condition applies for controlling deciding which part of the set of resources is to be utilized for the D2D communication between the wireless communication device and the further wireless communication device. In this way, it can be taken into account that the risk or level of interference may vary between different parts of the set of resources.

According to an embodiment, the set of resources comprises a first subset of resources allocated to DL transmissions from the base station and a second subset of resources allocated for UL transmissions to the base station. The at least one condition may then apply for controlling the utilization of the set of resources by deciding whether to utilize at least one of the first subset of resources and the second subset of resources for the D2D communication between the wireless communication device and the further wireless communication device. For example, under conditions where the wireless communication device is far away from the base station, there is a risk that utilization of the first subset of resources by the wireless communication device causes excessive interference for DL transmissions to another nearby wireless communication device. This may be considered by the base station by defining the condition such that the wireless communication device is then only allows to utilize only the second subset of resources.

According to an embodiment, the at least one condition applies for controlling the utilization of the set of resources by setting one or more transmission parameters for the D2D communication. For example, the transmission parameters may include a transmit power, a modulation scheme, and/or a coding scheme. In this way, the base station may adapt the D2D communication of the wireless communication device in such a way that the interference remains on a tolerable level.

According to an embodiment, the at least one condition is based on strength of a signal as received by the wireless communication device from one or more base stations of the wireless communication network and/or on strength of a signal as received by the wireless communication device from one or more other wireless communication devices. These signals may allow for taking into account the expected interference situation when the wireless communication device utilizes the set of resources for D2D communication. For example, the signals may allow for taking into account the risk and/or level of interference with transmissions to or from the base station itself and/or the risk/and or level of interference with transmissions to or from one or more other base stations.

According to a further embodiment, a wireless communication device is provided. The wireless communication device comprises a radio interface for connecting to a wireless communication network. Further, the wireless communication device comprises at least one processor. The at least one processor is configured to receive, via the radio interface, resource allocation information from the wireless communication network. The resource allocation information indicates at least one condition for utilization of a set of resources allocated to D2D communication. Further, the at least one processor is configured to control, depending on the at least one condition, utilization of the set of resources for D2D communication between the wireless communication device and a further wireless communication device.

The at least one processor of the wireless communication device may be configured to perform the steps as performed by the wireless communication device in the above method.

Accordingly, the set of resources may be further allocated to communication with a base station of the wireless communication network. The at least one condition may then be based on a characteristic of a radio channel between the wireless communication device and the base station, e.g., on a radio channel quality, a received signal strength, and/or an SNR. Further, the characteristic of the radio channel could be based on a ratio of a received signal strength to a transmit power for UL communication from the wireless communication device. In particular, the at least one condition may be based on a comparison of the characteristic of the radio channel to a threshold.

Further, the at least one condition may be based on strength of a signal as received by the wireless communication device from one or more base stations of the wireless communication network and/or on strength of a signal as received by the wireless communication device from one or more other wireless communication devices.

According to an embodiment, the at least one processor of the wireless communication device is configured to control the utilization of the set of resources by deciding whether to utilize the set of resources for the D2D communication between the wireless communication device and the further wireless communication device.

According to an embodiment, the at least one processor of the wireless communication device is configured to control the utilization of the set of resources by deciding which part of the set of resources is to be utilized for the D2D communication between the wireless communication device and the further wireless communication device.

According to an embodiment, the set of resources comprises a first subset of resources allocated to DL transmissions from the base station and a second subset of resources allocated for UL transmissions to the base station. The at least one processor of the wireless communication device may then be configured to control the utilization of the set of resources by deciding whether to utilize at least one of the first subset of resources and the second subset of resources for the D2D communication between the wireless communication device and the further wireless communication device.

According to an embodiment, the at least one processor of the wireless communication device is configured to control the utilization of the set of resources by setting one or more transmission parameters for the D2D communication.

According to a further embodiment, a base station for a wireless communication network is provided. The base station comprises a radio interface for connecting to a wireless communication device. Further, the base station comprises at least one processor. The at least one processor is configured to determine a set of resources allocated to D2D communication and to determine at least one condition for controlling utilization of the set of resources for D2D communication between a wireless communication device and a further wireless communication device. Further, the at least one processor is configured to send, via the radio interface, resource allocation information indicating the at least one condition to the wireless communication device.

According to an embodiment, the at least one processor of the base station is configured to perform the steps as performed by the base station in the above method.

Accordingly, the set of resources may be further allocated to communication with a base station of the wireless communication network. The at least one condition may then be based on a characteristic of a radio channel between the wireless communication device and the base station, e.g., on a radio channel quality, a received signal strength, and/or an SNR. Further, the characteristic of the radio channel could be based on a ratio of a received signal strength to a transmit power for UL communication from the wireless communication device. In particular, the at least one condition may be based on a comparison of the characteristic of the radio channel to a threshold.

Further, the at least one condition may be based on strength of a signal as received by the wireless communication device from one or more base stations of the wireless communication network and/or on strength of a signal as received by the wireless communication device from one or more other wireless communication devices.

According to an embodiment, the at least one processor of the base station is configured to determine the at least one condition depending on availability of resources for D2D communication.

According to an embodiment, the at least one processor of the base station is configured to determine the at least one condition based on strengths of one or more signals as received by the base station.

According to an embodiment, the at least one processor of the base station is configured to determine the condition based on information received from one or more other base stations of the communication network.

According to an embodiment, the at least one condition determined by the at least one processor of the base station applies for controlling the utilization of the set of resources by deciding whether to utilize the set of resources for the D2D communication between the wireless communication device and the further wireless communication device.

According to an embodiment, the at least one condition determined by the at least one processor of the base station applies for controlling deciding which part of the set of resources is to be utilized for the D2D communication between the wireless communication device and the further wireless communication device.

According to an embodiment, the set of resources comprises a first subset of resources allocated to DL transmissions from the base station and a second subset of resources allocated for UL transmissions to the base station. The at least one condition determined by the at least one processor of the base station may then apply for controlling the utilization of the set of resources by deciding whether to utilize at least one of the first subset of resources and the second subset of resources for the D2D communication between the wireless communication device and the further wireless communication device.

According to an embodiment, the at least one condition determined by the at least one processor of the base station applies for controlling the utilization of the set of resources by setting one or more transmission parameters for the D2D communication.

According to a further embodiment, a system is provided. The system comprises a wireless communication device and a base station which operate as described above. The wireless communication device is configured to receive resource allocation information from the wireless communication network. The resource allocation information indicates at least one condition for utilization of a set of resources allocated to D2D communication. Further, the wireless communication device is configured to control, depending on the at least one condition, utilization of the set of resources for D2D communication between the wireless communication device and a further wireless communication device. The base station is configured to determine the set of resources and the at least one condition and to provide the resource allocation information to the wireless communication device.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to control of communication in a wireless communication network, in particular to control of D2D communication between two wireless communication devices in scenarios where utilization of resources for the D2D communication is controlled by the wireless communication network, e.g., by a base station of the wireless communication network. For enabling the control, at least one of the wireless communication devices can establish a direct link to the base station and receive resource allocation information for controlling the utilization of resources for the D2D communication. Here, it is noted that the direct link may be maintained during the D2D communication, but that in some scenarios the D2D communication may also occur after the resource allocation information was received and the direct link released or interrupted. The D2D communication may be used for various purposes, e.g., for setting up a relay based connection which is based on the direct link between the base station and one of the wireless communication devices and a D2D communication link between this wireless communication device and the other wireless communication device. In a specific example, the D2D communication may be used for setting up a relay based network, also referred to as capillary or kinetic network, where one wireless communication device operates as a relay station for multiple other wireless communication devices, using D2D communication links between the wireless communication device and the other wireless communication devices.

In the examples as illustrated in the following, the wireless communication network is assumed to be based on the LTE radio technology. In accordance with the LTE terminology, the wireless communication devices will in the following be referred to as UEs, and base stations of the wireless communication network will be referred to as eNB. When using the LTE radio technology, the above-mentioned direct connection between the UE and the eNB may be based on the LTE Uu radio interface. The above-mentioned direct connection between the relay UE and the eNB may be based on the LTE Uu-n radio interface The D2D communication may be based on the LTE sidelink communication, using the PC5 radio interface, as for example described in 3GPP TS 23.303 V14.0.0 (2016-09). However, it is to be understood that other technologies could be utilized as well, such as the NR (New Radio) technology developed by 3GPP and a corresponding D2D technology.

Figure 1:
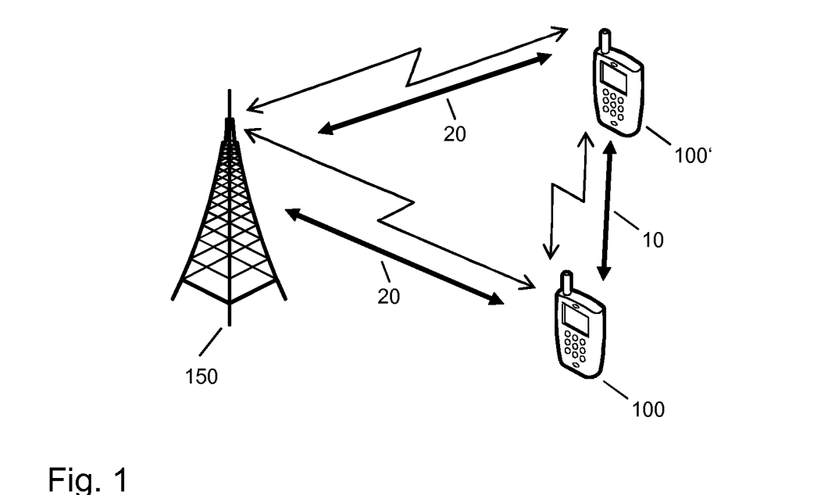
FIG. 1 schematically illustrates a scenario of D2D communication according to an embodiment of the invention.

FIG. 1 illustrates an example of a scenario in which sidelink (SL) communication of two UEs 100, 100' is controlled by an eNB 150. As illustrated, an SL connection 10 is established between the UEs 100, 100'. Further, a direct link 20 is established between each of the UEs 100, 100' and the eNB 150. The eNB 150 allocates radio resources to be used for the D2D communication on the SL connection 10 and may use the direct link 20 for sending corresponding control information to the UEs 100, 100', in particular resource allocation information for controlling utilization of radio resources for the D2D communication on the SL connection 10. It is noted that in some scenarios the direct link 20 could be present only for one of the UEs 100, 100'. Further, the SL connection 10 could also be established or maintained after release or interruption of the direct link(s) 20.

For achieving efficient utilization of radio resources for both the sidelink communication link and direct links 20 of the eNB 150, including direct links to other UEs which are not illustrated in FIG. 1, the eNB 150 may allocate the radio resources in such a way that some radio resources are shared by the direct links 20 and the SL connection 10. This sharing of radio resources may result on collisions and interference of transmissions on the SL connection 10 with transmissions on one of the direct links 20. However, since the distance over which the SL connection 10 extends is typically much shorter than the distances over which direct connections extend, the resulting levels of interference may be tolerable. For example, the transmit power used on the SL connection 10 may be so low that the transmission on the SL connection 10 will not be detected by the eNB 150 or another UE located in another region of a cell served by the eNB 150 so that the direct link between the eNB 150 and this other UE will not be affected by the transmission on the SL connection 10. Accordingly, the SL connection 10 between the UEs 100, 100' would typically be based on radio resources which are shared with direct links of other UEs, while the UE's 100, 100' own direct links 20 are based on radio resources which are not shared with the SL connection 10, e.g., by using different frequencies.

Figure 2:
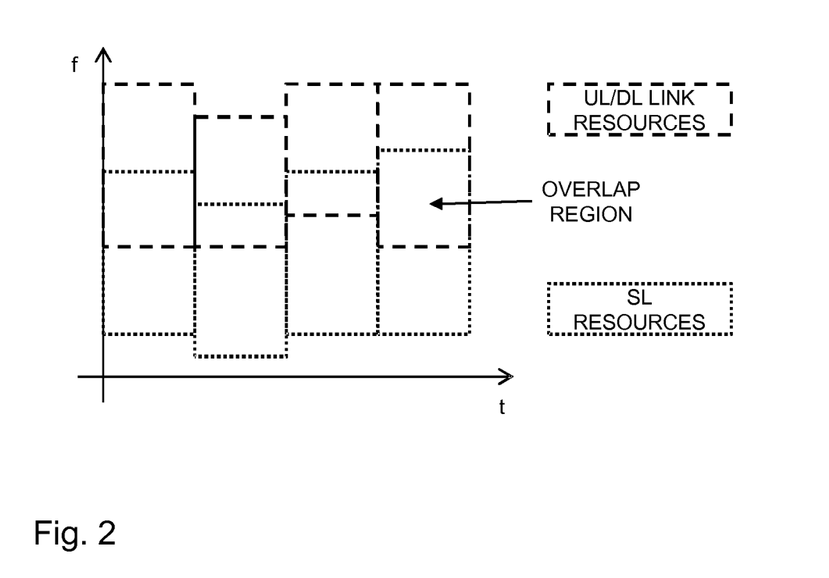
FIG. 2 schematically illustrates an example resource sharing according to an embodiment of the invention.

FIG. 2 shows an example of how the sharing of radio resources may be implemented in the time (t) and frequency (f) domain. In the example of FIG. 2, the allocation of resources is assumed to be organized in time slots. In each time slot, the eNB 150 may allocate a certain part of the available radio resources, e.g., a first set of resource blocks, to the direct links of the eNB 150. These radio resources are denoted as DL/UL resources and illustrated by dashed boxes. Further, the eNB 150 may allocate a part of the available radio resources, e.g., a second set of resource blocks, to the SL connection 10 between the UEs 100, 100'. These radio resources are denoted as SL resources and illustrated by dotted boxes. Here, it is noted that the SL resources do not need to be allocated exclusively to the SL connection 10 between the UEs 100, 100', but could also be allocated to multiple SL connections controlled by the eNB 150. For example, the SL resources could correspond to a resource pool from which the UEs controlled by the eNB 150 may select radio resources to be utilized on their respective SL connections.

As illustrated by an overlap region of the dashed and dotted boxes, a part of the radio resources may be shared by the direct links and the SL connections. Accordingly, a UE 100, 100' can utilize these shared radio resources for a transmission on the SL connection 10, even though they could at the same time also be utilized for a DL transmission or a UL transmission on a direct link. In some scenarios, there is also the possibility that the shared radio resources are at the same time utilized for transmissions on different SL connections. As a general rule, such simultaneous utilization may result in interference and/or collisions.

Various kinds of collision handling mechanisms may be utilized to detect or avoid collisions of transmissions on the shared SL resources, such as CSMA/CA (Carrier Sense Multiple Access/Collision Avoidance), CSMA/CD (Carrier Sense Multiple Access/Collision Detection), or CSMA/CR (Carrier Sense Multiple Access/Collision Resolution).

It is noted that the way of resource sharing as illustrated in FIG. 1 is merely exemplary and that other ways could be utilized as well. For example, in a TDD (Time Division Duplex) operation mode for the DL and UL transmissions, some time slots could be allocated for DL transmissions while other time slots are allocated for UL transmissions. In this case, the sharing of resources could also be implemented by allowing utilization of some of the time slots allocated for UL transmissions also for transmission on an SL connection, such as the SL connection 10.

In order to control the risk or level of interference associated with the transmissions on the shared resources to a tolerable level, the resource allocation information provided by the eNB 150 to the UEs 100, 100' indicates at least one condition to be applied by the UE 100, 100' for controlling its utilization of the shared resources. This condition may be based on radio conditions observed by the UE 100, 100', such as a characteristic of a radio channel between the UE 100, 100' and the eNB 100 and/or the strengths of signals as received by the UE 100, 100' from potential interferers, such as other eNBs and/or other UEs. The characteristic of the radio channel between the UE 100, 100' and the eNB 100 may, for example, represent radio channel quality and be considered in terms of an RSSI (Received Signal Strength Indicator) or in terms of an SNR of a signal received from the eNB 150. Similarly, the strengths of signals from potential interferers may be considered in terms of an RSSI or SNR of these signals, e.g., the strength of signals from other eNBs or other UEs. Further, the characteristic of the radio channel could be based on a ratio of a received signal strength to a transmit power for UL communication from the wireless communication device.

The condition may be based on comparing the observed characteristic of the radio channel and/or the observed signal strengths to one or more thresholds. Depending on such comparison, the UE 100, 100' may then decide whether it should utilize the shared resources for a transmission on the SL connection 10. Further, the UE 100, 100' may decide depending on such comparison how to utilize the shared resources, e.g., by setting transmit power, modulation scheme, and/or coding scheme to be applied for the transmission on the shared resources. Further, the UE 100, 100' may decide depending on such comparison which part of the shared resources is to be utilized for the transmission on the shared resources. For example, in some situations the condition may be defined to allow only utilization of a part of the shared resources, which is allocated to UL transmissions on direct links, because the risk for excessive interference would be too high when utilizing a part of the shared resources which is allocated to DL transmissions on direct links.

Figure 3:
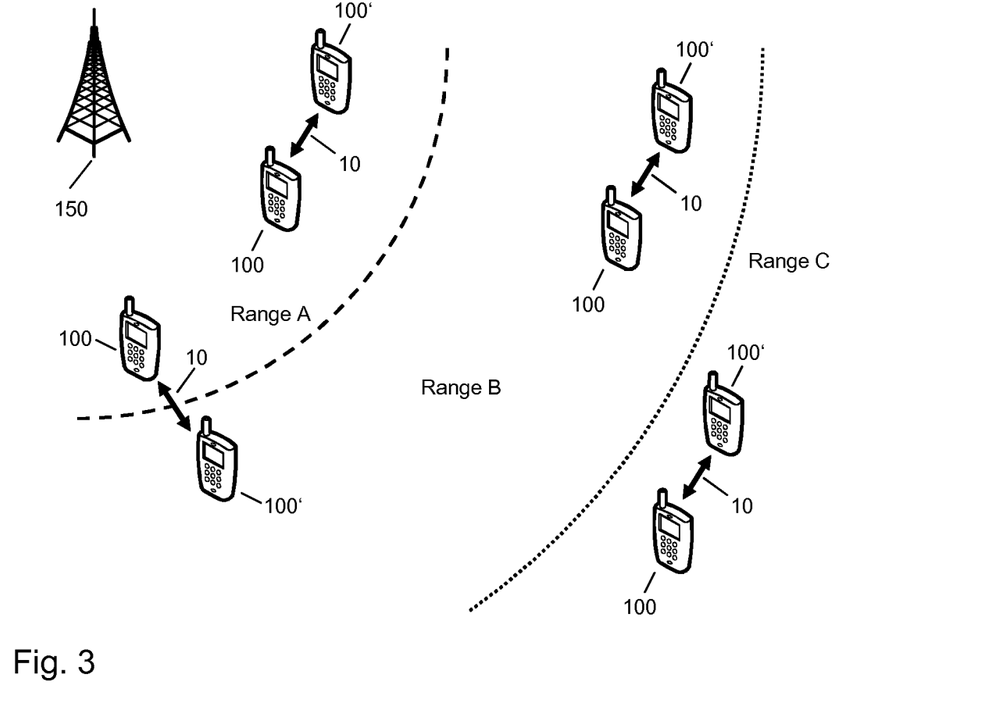
FIG. 3 schematically illustrates an example of how conditions may be defined for controlling D2D communication according to an embodiment of the invention.

FIG. 3 shows an example how such conditions based on thresholds can be defined. In the example of FIG. 3, the conditions are assumed to be defined in terms of a radio channel quality between the respective UE 100, 100' and the eNB 150. FIG. 3 shows different pairs of UEs 100, 100' connected by a SL connection 10. The UEs 100, 100' are located in different ranges around the eNB 150. In a first range (denoted as range A), the radio channel quality is above a first threshold. In a second range (denoted as range B), the radio channel quality is between the first threshold and a second threshold, which is lower than the first threshold. In a third range (denoted as range C), the radio channel quality is below the second threshold. As can be seen, the thresholds define different ranges of the distance between the UE 100, 100' and the eNB 100.

In range A, the UE 100, 100' is close to the eNB 100. In this range, the received power of DL transmissions from the eNB 150 is very high, and the interference caused when a UE 100, 100' in this range performs an SL transmission on the DL part of the shared resources thus most likely will not adversely affect the DL transmissions from the eNB 150. Accordingly, a first condition may be defined to allow the UE 100, 100' utilization of both the DL part and the UL part of the shared resources for SL transmissions, with full transmit power on the DL part, if the observed radio channel quality is above the first threshold.

In range B, the UE 100, 100' is further away from to the eNB 100. In this range, the received power of DL transmissions from the eNB 150 is still high, and the interference caused when a UE 100, 100' in this range performs an SL transmission on the DL part of the shared resources with reduced transmit power will most likely not adversely affect the DL transmissions from the eNB 150. Accordingly, a second condition may be defined to allow the UE 100, 100' utilization of both the DL part and the UL part of the shared resources for SL transmissions, with reduced transmit power on the DL part, if the observed radio channel quality is between the first threshold and the second threshold.

In range C, the UE 100, 100' is still further away from to the eNB 100. In this range, the received power of DL transmissions from the eNB 150 is low, and the interference caused when a UE 100, 100' in this range performs an SL transmission on the DL part of the shared resources will most likely adversely affect the DL transmissions from the eNB 150. Accordingly, a third condition may be defined to allow the UE 100, 100' utilization of only the UL part of the shared resources for SL transmissions with, if the observed radio channel quality below the second threshold.

It is noted that in addition or as an alternative to setting the transmit power, the conditions could also define different settings of other transmission parameters, such as coding scheme and/or modulation scheme. For example, in addition to using a lower transmit power a more robust modulation and/or coding scheme may be used in order to compensate for the lower transmit power.

Figure 4:
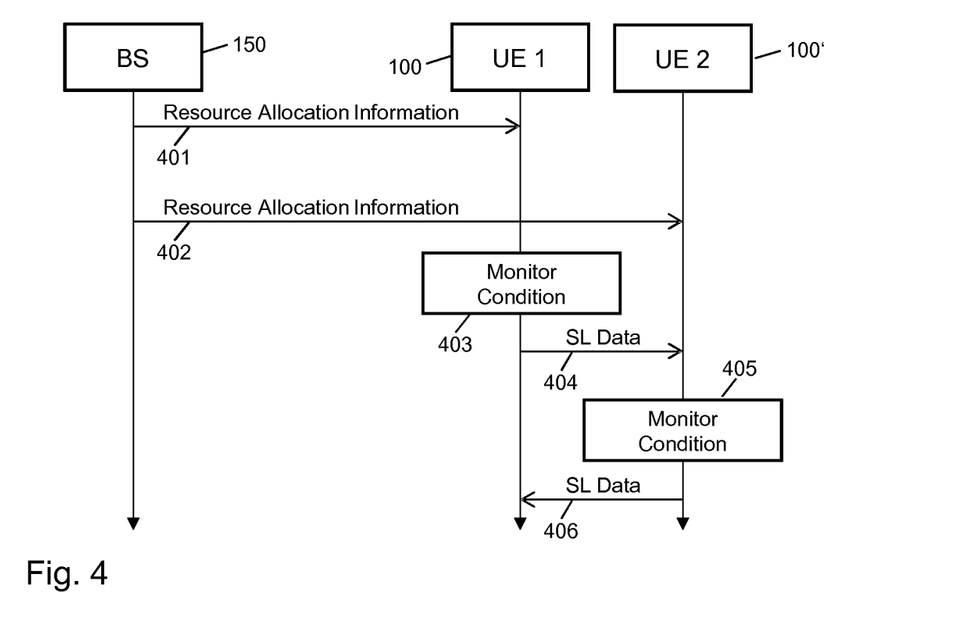
FIG. 4 schematically illustrates an example of processes according to an embodiment of the invention.

FIG. 4 shows an example of processes which are based on the concepts as outlined above. The processes of FIG. 4 involve a first UE 100, a second UE 100', and the eNB 150 which controls D2D communication on an SL connection between the UEs 100, 100'.

In the example of FIG. 4, the eNB 150 sends resource allocation information 401 to the first UE 100. The resource allocation information 401 indicates one or more conditions to be applied by the first UE 100 with respect to utilization of radio resources allocated for D2D communication on the SL connection between the first UE 100 and the second UE 100'. The radio resources are assumed to be a set of radio resources which is shared with DL transmissions from the eNB 150 and uplink transmissions to the eNB 150. For example, the set of radio resources may correspond to radio resources from an overlap region of radio resources allocated for DL and UL transmissions and radio resources allocated for SL transmissions as illustrated in FIG. 2. The condition(s) may for example correspond to one or more conditions which are based on comparing a radio channel quality between the first UE 100 and the eNB 150 to one or more thresholds, such as explained in connection with FIG. 3.

Further, the eNB 150 also sends resource allocation information 402 to the second UE 100'. The resource allocation information 402 indicates one or more conditions to be applied by the second UE 100' with respect to utilization of the radio resources allocated for D2D communication on the sidelink connection between the first UE 100 and the second UE 100'. Also in this case, the condition(s) may for example correspond to one or more conditions which are based on comparing a characteristic of a radio channel between the first UE 100 and the eNB 150 to one or more thresholds, such as explained in connection with FIG. 3. The condition(s) may be the same as those indicated to the first UE 100, but could also differ from the condition(s) indicated to the first UE 100. For example, using conditions which differ between the first UE 100 and the second UE 100' could be beneficial in cases where the first UE 100 and the second UE 100' are of different types of have different capabilities.

The in addition to the condition(s), the resource allocation information 401, 402 may also indicate the allocated resources to which the condition refers, e.g., by identifying one or more resource blocks and/or by defining a resource pool. The resource allocation information 402 may, for example, be transmitted in an RRC (Radio Resource Control) message. However, other message types could be utilized as well, e.g., physical layer control information, MAC (Medium Access Control) layer control information, or broadcasted system information. The resource allocation information may be UE specific or cell specific. It is noted that other ways for defining conditions could be utilized as well, e.g., by including one or more indicators referring to pre-defined conditions into the resource allocation information 401, 402. Such pre-defined conditions could for example be based on operator settings or on standardization requirements of the underlying radio technology.

As illustrated by block 403, the first UE 100 then monitors the condition(s) indicated by the resource allocation information 401 and, depending on the monitored condition(s), controls transmission of SL data 404 on the SL connection to the second UE 100'. For example, this may involve deciding whether to use the allocated set of radio resources for the transmission of SL data 404. If the UE 100 decides not to use the set of allocated resources, it may perform the transmission of SL data 404 on other radio resources, such as radio resources exclusively allocated for D2D communication. An example of radio resources exclusively allocated for D2D communication are the SL resources outside the overlap region as illustrated in FIG. 2. Further, the first UE 100 may decide depending on the condition(s) to utilize only a certain part of the allocated set of resources for the transmission of SL data 404, such as only a part, which is also allocated to UL transmissions. Further, the first UE 100 may decide depending on the condition(s) to apply certain transmission parameters for the transmission of SL data 404, e.g., to either utilize full transmit power or reduced transmit power and/or to utilize a certain modulation scheme and/or coding scheme.

As illustrated by block 405, the second UE 100' monitors the condition(s) indicated by the resource allocation information 402 and, depending on the monitored condition(s), controls transmission of SL data 406 on the SL connection to the first UE 100. For example, this may involve deciding whether to use the allocated set of radio resources for the transmission of SL data 406. If the UE 100' decides not to use the set of allocated resources, it may perform the transmission of SL data 406 on other radio resources, such as radio resources exclusively allocated for D2D communication. Further, the second UE 100' may decide depending on the condition(s) to utilize only a certain part of the allocated set of resources for the transmission of SL data 406, such as only a part which is also allocated to UL transmissions. Further, the second UE 100' may decide depending on the condition(s) to apply certain transmission parameters for the transmission of SL data 406, e.g., to either utilize full transmit power or reduced transmit power and/or to utilize a certain modulation scheme and/or coding scheme.

By considering the indicated condition(s) at blocks 403 and 405, the UEs 100, 100' may control the SL transmissions 404 and 406 in such a way that interference is avoided or at least kept on a tolerable level.

It is to be understood that the processes of FIG. 4 could also be implemented for unidirectional transmission of SL data. In this case, the resource allocation information 401 or 402 could be indicated to only that one of the UEs 100, 100' which sends the SL data. Further, also in scenarios where only one of the UEs 100, 100' has a direct connection to the eNB 150, the eNB 150 could send the resource allocation information 401 or 402 to this UE 100, 100', from where the resource allocation information 401, 402 could then be forwarded to the other UE 100, 100'.

Figure 5:
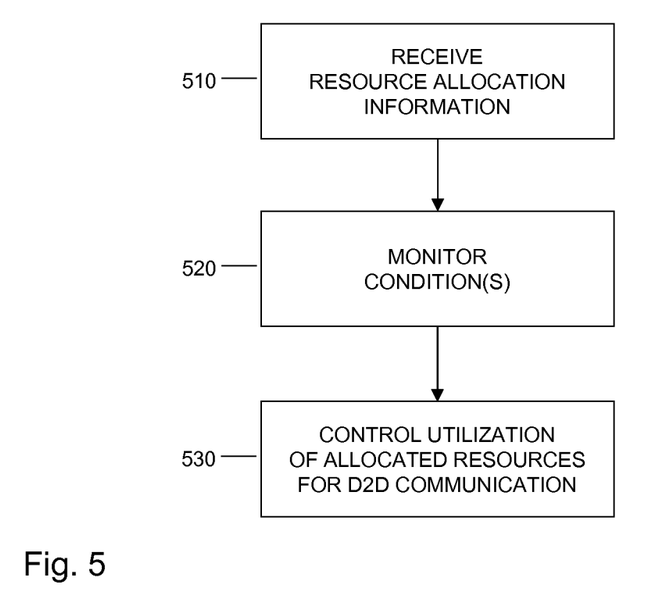
FIG. 5 shows a flowchart for illustrating a method according to an embodiment of the invention, which may be implemented by a wireless communication device.

FIG. 5 shows a flowchart illustrating a method of controlling communication in a wireless communication network, by which a wireless communication device, e.g., one of the above-mentioned UEs 100, 100', may implement concepts as described above. If a processor based implementation of the wireless communication device is utilized, at least a part of the steps of the method may be performed and/or controlled by one or more processors of the wireless communication device.

At step 510, the wireless communication device receives resource allocation information from the wireless communication network. The resource allocation information indicates at least one condition for utilization of a set of resources allocated to D2D communication. The wireless communication device may receive the resource allocation information from a base station of the wireless communication network, e.g., a base station which is responsible for controlling both communication on a direct connection between the wireless communication device and the base station and for controlling the D2D communication with the further wireless communication device. An example of such base station is the above-mentioned eNB 150.

The set of resources may be further allocated to communication with a base station of the wireless communication network, e.g., may be used in a shared manner for the D2D communication and for DL and/or UL communication with the base station. An example of how such resource sharing may be implemented is illustrated in FIG. 2.

If the set of resources is also allocated to communication with a base station of the wireless communication network, the at least one condition may be based on a characteristic of a radio channel between the wireless communication device and the base station, e.g., on a radio channel quality, a received signal strength, and/or an SNR. Further, the characteristic of the radio channel could be based on a ratio of a received signal strength to a transmit power for UL communication from the wireless communication device. In particular, the at least one condition may be based on a comparison of the characteristic of the radio channel to a threshold.

Further, the at least one condition may be based on strength of a signal as received by the wireless communication device from one or more base stations of the wireless communication network and/or on strength of a signal as received by the wireless communication device from one or more other wireless communication devices.

In some scenarios, the wireless communication device may also forward the received resource allocation information to the further wireless communication device, e.g., if the further wireless communication device has no direct connection to the base station which provides the resource allocation information.

At step 520, the wireless communication device may monitor the at least one condition, e.g., by checking whether the at least one condition is met before utilizing the set of resources.

At step 530, the wireless communication device controls utilization of the set of resources for D2D communication between the wireless communication device and a further wireless communication device. This is accomplished depending on the at least one condition. This may involve that the wireless communication device decides whether to utilize the set of resources for the D2D communication between the wireless communication device and the further wireless communication device. In addition as an alternative, this may involve that the wireless communication device decides which part of the set of resources is to be utilized for the D2D communication between the wireless communication device and the further wireless communication device. For example, the set of resources may include a first subset of resources allocated to DL transmissions from the base station, i.e., a DL part, and a second subset of resources allocated for UL transmissions to the base station, i.e., a UL part. The wireless communication device may then decide whether to utilize at least one of the first subset of resources and the second subset of resources for the D2D communication between the wireless communication device and the further wireless communication device. For example, under conditions where the wireless communication device is far away from the base station, there is a risk that utilization of the first subset of resources by the wireless communication device causes excessive interference for DL transmissions to another nearby wireless communication device, and the wireless communication device may thus decide to utilize only the second subset of resources, i.e., the only the UL part.

Further, at step 530 the wireless communication device may control the utilization of the set of resources by setting one or more transmission parameters for the D2D communication. For example, this may involve setting a transmit power, a modulation scheme, and/or a coding scheme. In this way, the wireless communication device may adapt its D2D communication in such a way that the interference remains on a tolerable level.

Figure 6:
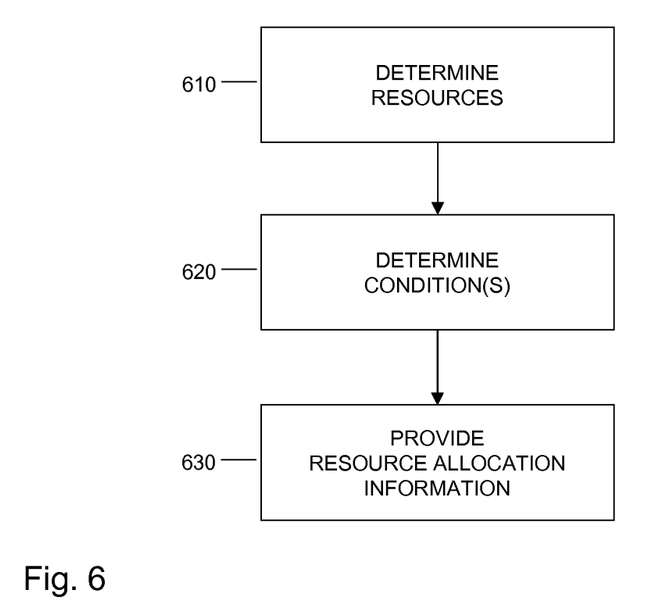
FIG. 6 shows a flowchart for illustrating a further method according to an embodiment of the invention, which may be implemented by a base station.

FIG. 6 shows a flowchart illustrating a method of controlling communication in a wireless communication network, by which a base station of the wireless communication network, e.g., the above-mentioned eNB 150, may implement concepts as described above. If a processor based implementation of the access node is utilized, at least a part of the steps of the method may be performed and/or controlled by one or more processors of the node.

At step 610, the base station of the wireless communication network determines a set of resources allocated to D2D communication. The set of resources may be further allocated to communication with a base station of the wireless communication network, e.g., may be used in a shared manner for the D2D communication and for DL and/or UL communication with the base station. An example of how such resource sharing may be implemented is illustrated in FIG. 2.

At step 620, the base station determines at least one condition for controlling utilization of the set of resources for D2D communication between a wireless communication device and a further wireless communication device, such as the above-mentioned UEs 100, 100'.

If the set of resources is also allocated to communication with a base station of the wireless communication network, the at least one condition may be based on a characteristic of a radio channel between the wireless communication device and the base station, e.g., on a radio channel quality, a received signal strength, and/or an SNR. Further, the characteristic of the radio channel could be based on a ratio of a received signal strength to a transmit power for UL communication from the wireless communication device. In particular, the at least one condition may be based on a comparison of the characteristic of the radio channel to a threshold.

Further, the at least one condition may be based on strength of a signal as received by the wireless communication device from one or more base stations of the wireless communication network and/or on strength of a signal as received by the wireless communication device from one or more other wireless communication devices.

The base station may determine the at least one condition depending on availability of resources for D2D communication. This availability may for example vary depending on a load in the wireless communication network. For example, in situations when the load is high and only few resources are available for D2D communication, the base station may choose another condition than in situations when the load is low and more resources are available for D2D communication.

In addition or as an alternative, the base station may determine the at least one condition based on strengths of one or more signals as received by the base station. In this way, the base station can adapt the actual utilization of the set of resources by the wireless communication device to different interference situations. For example, in situations when high interference is expected, the base station may choose another condition than in situations when the lower interference is expected.

In addition or as an alternative, the base station may determine the at least one condition based on information received from one or more other base stations of the communication network. In this way, the base station can coordinate the condition with the other base stations. This may allow for reducing the risk and/or level of interference of communication controlled by the other base stations on the D2D communication of the wireless communication device. Further, this may allow for reducing the risk and/or level of interference caused by the D2D communication of the wireless communication device with respect to communication controlled by the other base stations.

At step 630, the base station sends resource allocation information indicating the at least one condition determined at step 620 to the wireless communication device. In addition to the at least one condition, the resource allocation information may also indicate the set of radio resources to which the at least one condition refers. However, in some scenarios the at least one condition could also be indicated separately from the set of radio resources.

The base station may send the resource allocation information to both the wireless communication device and the further wireless communication device. In some scenarios, the wireless communication device may also forward the resource allocation information to the further wireless communication device, e.g., if the further wireless communication device has no direct connection to the base station.

The at least one condition may apply for controlling the utilization of the set of resources by deciding whether to utilize the set of resources for the D2D communication between the wireless communication device and the further wireless communication device. In this way, interference with other transmissions on the set of radio resources can be efficiently avoided by allowing utilization of the set of radio resources only under conditions when the risk or level of interference is low.

In addition or as an alternative, the at least one condition may apply for controlling deciding which part of the set of resources is to be utilized for the D2D communication between the wireless communication device and the further wireless communication device. In this way, it can be taken into account that the risk or level of interference may vary between different parts of the set of resources.

The set of resources comprises a first subset of resources allocated to DL transmissions from the base station, i.e., a DL part, and a second subset of resources allocated for UL transmissions to the base station, i.e., a UL part. The at least one condition may then apply for controlling the utilization of the set of resources by deciding whether to utilize at least one of the first subset of resources and the second subset of resources for the D2D communication between the wireless communication device and the further wireless communication device. For example, under conditions where the wireless communication device is far away from the base station, there is a risk that utilization of the first subset of resources by the wireless communication device causes excessive interference for DL transmissions to another nearby wireless communication device. This may be considered by the base station by defining the condition such that the wireless communication device is then only allows to utilize only the second subset of resources.

In addition or as an alternative, the at least one condition may apply for controlling the utilization of the set of resources by setting one or more transmission parameters for the D2D communication. For example, the transmission parameters may include a transmit power, a modulation scheme, and/or a coding scheme. In this way, the base station may adapt the D2D communication of the wireless communication device in such a way that the interference remains on a tolerable level.

It is noted that the methods of FIGS. 5 and 6 may also be combined in a system, which includes a wireless communication device operating according to the method of FIG. 5 and a base station operating according to the method of FIG. 6. In such system the base station may provide the resource allocation information to the wireless communication device.

Figure 7:
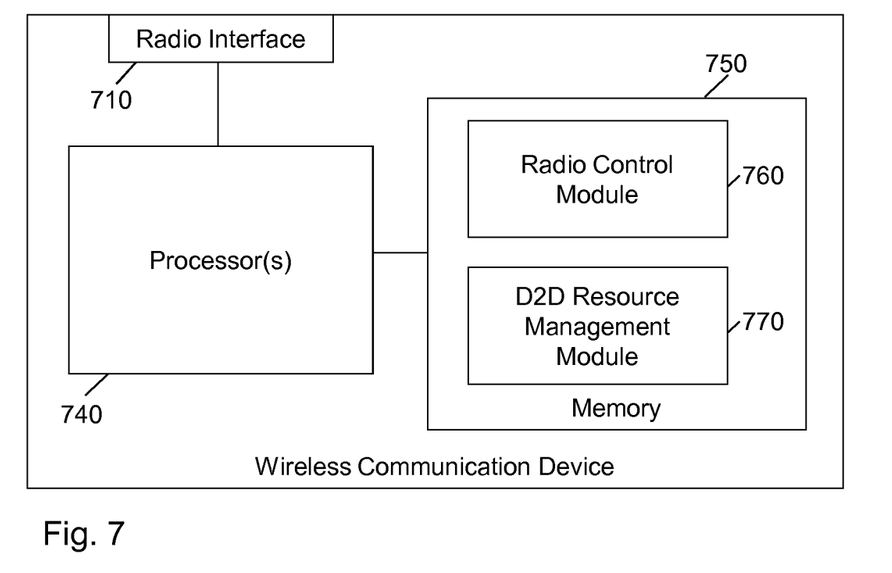
FIG. 7 schematically illustrates a processor-based implementation of a wireless communication device according to an embodiment of the invention.

FIG. 7 shows a block diagram for schematically illustrating a processor based implementation of a wireless communication device, which may be utilized for implementing the above concepts. The wireless communication device may for example correspond to a UE, such as one of the abovementioned UEs 100, 100'.

As illustrated, the wireless communication device includes a radio interface 710. The wireless communication device may utilize the radio interface 710 for connecting to a wireless communication network, e.g., through a base station of the wireless communication network, such as the eNB 150. Further, the wireless communication device may utilize the radio interface 710 for establishing a direct connection to the base station and for establishing a D2D communication link to another wireless communication device. In other words, the radio interface 710 may support both direct connectivity to the wireless communication network and D2D communication.

Further, the wireless communication device is provided with one or more processors 740 and a memory 750. The radio interface 710, and the memory 750 are coupled to the processor(s) 740, e.g., using one or more internal bus systems of the wireless communication device.

The memory 750 includes program code modules 760, 770 with program code to be executed by the processor(s) 740. In the illustrated example, these program code modules include a radio control module 760 and a D2D resource management module 770.

The radio control module 760 may implement and control functionalities for establishing, maintaining, releasing, and utilizing a connection to the wireless communication network. Further, the radio control module 760 may implement and control functionalities for establishing, maintaining, releasing, and utilizing a D2D connection to another wireless communication device. The D2D resource management module 770 may implement and control the above-described functionalities of utilizing resources allocated for D2D communication in a conditional manner, e.g., as described in connection with FIG. 5.

It is to be understood that the structures as illustrated in FIG. 7 are merely exemplary and that the wireless communication device may also include other elements which have not been illustrated, e.g., structures or program code modules for implementing known functionalities of a UE or other type of wireless communication device.

Figure 8:
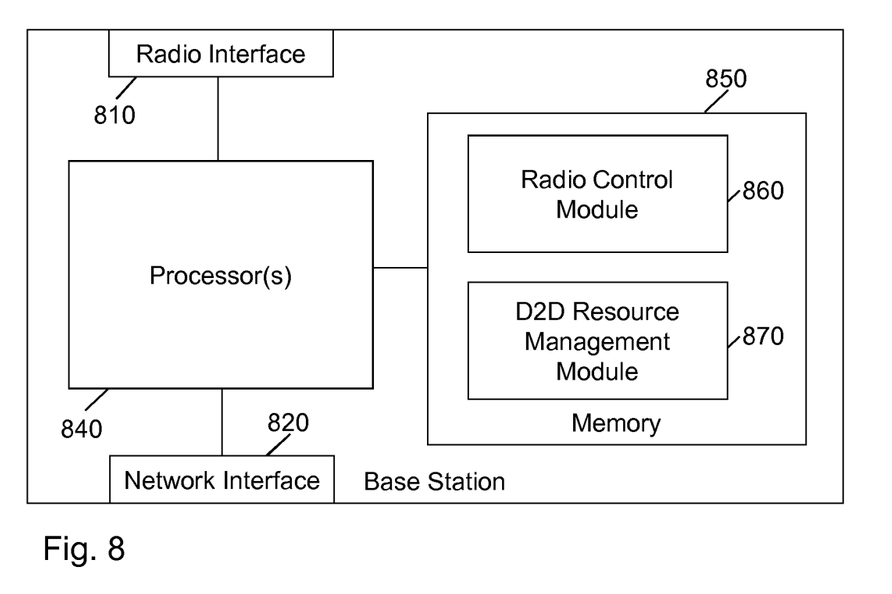
FIG. 8 schematically illustrates a processor-based implementation of a base station according to an embodiment of the invention.

FIG. 8 shows a block diagram for schematically illustrating a processor based implementation of a base station of a wireless communication network which may be utilized for implementing the above concepts, such as above-mentioned the above-mentioned eNB 150.

As illustrated, the access node includes a radio interface 810. The access node may utilize the radio interface 810 for connecting to one or more wireless communication devices, such as the above-mentioned UEs 100, 100'. Further, the base station may utilize the radio interface 810 for establishing a direct connection to the wireless communication devices. Further, the base station may utilize the radio interface 810 for providing resource allocation information for D2D communication to the wireless communication devices. As further illustrated, the base station may also be provided with a network interface 820, which may be used for connecting to other nodes of the wireless communication network, e.g., to other base stations or to core network nodes.

Further, the base station is provided with one or more processors 840 and a memory 850. The radio interface 810, and the memory 850 are coupled to the processor(s) 840, e.g., using one or more internal bus systems of the base station.

The memory 850 includes program code modules 860, 870 with program code to be executed by the processor(s) 840. In the illustrated example, these program code modules include a radio control module 860, and a D2D resource management module 870.

The radio control module 860 may implement and control functionalities of establishing, maintaining, releasing, and utilizing direct connections to the wireless communication devices, e.g., by allocating resources for transmissions on such direct connections. The D2D resource management module 870 may implement the above-described functionalities of controlling conditional utilization of resources allocated for D2D communication, e.g., as described in connection with FIG. 6.

It is to be understood that the structures as illustrated in FIG. 8 are merely exemplary and that the base station may also include other elements which have not been illustrated, e.g., structures or program code modules for implementing known functionalities of an eNB or other type of base station.

It is to be understood that the concepts as explained above are susceptible to various modifications. For example, the concepts could be applied in connection with various kinds of radio technologies and radio devices, without limitation to the above-mentioned examples of the LTE radio technology or NR technology.

The invention claimed is:

1. A method of controlling communication in a wireless communication network, the method comprising:
   a wireless communication device receiving a Radio Resource Control (RRC) message comprising resource allocation information from the wireless communication network, the resource allocation information indicating a set of resources allocated by the wireless communication network to be used by the wireless communication device for device-to-device communication and at least one condition for utilization of the set of resources, wherein the at least one condition applies for controlling the utilization of the set of resource by setting one or more transmission parameters for the device-to-device communication, and wherein the one or more transmission parameters comprise one or more of a transmit power, a modulation scheme, or a coding scheme; and
   depending on the at least one condition, the wireless communication device controlling utilization of the set of resources for device-to-device communication between the wireless communication device and a further wireless communication device.

2. The method according to claim 1, wherein the set of resources is further allocated to communication with a base station of the wireless communication network.

3. The method according to claim 2, wherein the at least one condition is based on a characteristic of a radio channel between the wireless communication device and the base station of the wireless communication network.

4. The method according to claim 3, wherein the at least one condition is based on a comparison of the characteristic of the radio channel to a threshold.

5. The method according to claim 1, wherein the wireless communication device controls the utilization of the set of resources by deciding whether to utilize the set of resources for the device-to-device communication between the wireless communication device and the further wireless communication device.

6. The method according to claim 1, wherein the set of resources comprises a first subset of resources allocated to downlink transmissions from the base station and a second subset of resources allocated for uplink transmissions to the base station, and wherein the wireless communication device controls the utilization of the set of resources by deciding whether to utilize at least one of the first subset of resources and the second subset of resources for the device-to-device communication between the wireless communication device and the further wireless communication device.

7. The method according to claim 1, wherein the at least one condition is based on strength of a signal as received by the wireless communication device from one or more base stations of the wireless communication network and/or on strength of a signal as received by the wireless communication device from one or more other wireless communication devices.

8. A method of controlling communication in a wireless communication network, the method comprising:
- a base station of the wireless communication network determining a set of resources allocated by the wireless communication network to be used by a wireless communication device for device-to-device communication;
- the base station determining at least one condition for controlling utilization of the set of resources for device-to-device communication between the wireless communication device and a further wireless communication device; and
- the base station sending a Radio Resource Control (RRC) message comprising resource allocation information indicating the set of resources and the at least one condition to the wireless communication device, wherein the at least one condition applies for controlling the utilization of the set of resource by setting one or more transmission parameters for the device-to-device communication, and wherein the one or more transmission parameters comprise one or more of a transmit power, a modulation scheme, or a coding scheme.

9. The method according to claim 8,
wherein the base station determines the at least one condition depending on availability of resources for device-to-device communication.

10. The method according to claim 8,
wherein the base station determines the at least one condition based on strengths of one or more signals as received by the base station.

11. The method according to claim 8,
wherein the base station determines the at least one condition based on information received from one or more other base stations of the communication network.

12. The method according to claim 8,
wherein the set of resources is further allocated to communication with the base station.

13. The method according to claim 12,
wherein the at least one condition is based on a characteristic of a radio channel between the wireless communication device and the base station.

14. The method according to claim 13,
wherein the at least one condition is based on a comparison of the characteristic of the radio channel to a threshold.

15. The method according to claim 8,
wherein the at least one condition applies for controlling the utilization of the set of resources by deciding whether to utilize the set of resources for the device-to-device communication between the wireless communication device and the further wireless communication device.

16. The method according to claim 10,
wherein the set of resources comprises a first subset of resources allocated to downlink transmissions from the base station and a second subset of resources allocated for uplink transmissions to the base station, and
wherein the at least one condition applies for controlling the utilization of the set of resources by deciding whether to utilize at least one of the first subset of resources and the second subset of resources for the device-to-device communication between the wireless communication device and the further wireless communication device.

17. The method according to claim 8,
wherein the at least one condition is based on strength of a signal as received by the wireless communication device from one or more base stations of the wireless communication network and/or on strength of a signal as received by the wireless communication device from one or more other wireless communication devices.

18. A wireless communication device, comprising:
- a radio interface for connecting to a wireless communication network; and
- at least one processor,
- the at least one processor being configured to:
- via the radio interface, receive a Radio Resource Control (RRC) message comprising resource allocation information from the wireless communication network, the resource allocation information indicating a set of resources allocated by the wireless communication network to be used by the wireless communication device for device-to-device communication and at least one condition for utilization of the set of resources, wherein the at least one condition applies for controlling the utilization of the set of resource by setting one or more transmission parameters for the device-to-device communication, and wherein the one or more transmission parameters comprise one or more of a transmit power, a modulation scheme, or a coding scheme; and
- depending on the at least one condition, control utilization of the set of resources for device-to-device communication between the wireless communication device and a further wireless communication device.

19. A base station for a wireless communication network, the base station comprising:
- a radio interface for connecting to a wireless communication device; and
- at least one processor,
- the at least one processor being configured to:
- determine a set of resources allocated by the wireless communication network to be used by a wireless communication device for device-to-device communication;
- determine at least one condition for controlling utilization of the set of resources for device-to-device communication between the wireless communication device and a further wireless communication device; and
- via the radio interface, the base station sending a Radio Resource Control (RRC) message comprising resource allocation information indicating the set of resources and the at least one condition to the wireless communication device, wherein the at least one condition applies for controlling the utilization of the set of resource by setting one or more transmission parameters for the device-to-device communication, and wherein the one or more transmission parameters comprise one or more of a transmit power, a modulation scheme, or a coding scheme.

* * * * *